(12) United States Patent
Vepsäläinen et al.

(10) Patent No.: US 7,684,775 B2
(45) Date of Patent: *Mar. 23, 2010

(54) METHOD AND APPARATUS FOR COMPENSATING DC LEVEL IN AN ADAPTIVE RADIO RECEIVER

(75) Inventors: Jussi Vepsäläinen, Helsinki (FI); Aarno Pärssinen, Espoo (FI); Pauli Seppinen, Espoo (FI); Mikael Gustafsson, Porvoo (FI)

(73) Assignee: Nokia Corporation, Espoo (FI)

( * ) Notice: Subject to any disclaimer, the term of this patent is extended or adjusted under 35 U.S.C. 154(b) by 486 days.

This patent is subject to a terminal disclaimer.

(21) Appl. No.: 11/601,897

(22) Filed: Nov. 20, 2006

(65) Prior Publication Data

US 2007/0066260 A1  Mar. 22, 2007

Related U.S. Application Data

(63) Continuation of application No. 10/378,172, filed on Mar. 3, 2003, now Pat. No. 7,139,542.

(51) Int. Cl.
*H04B 1/10* (2006.01)

(52) U.S. Cl. .................... 455/266; 455/307; 455/311; 455/312

(58) Field of Classification Search ................ 455/266, 455/307, 311, 312, 296, 303, 306, 339, 340
See application file for complete search history.

(56) References Cited

U.S. PATENT DOCUMENTS

| | | | |
|---|---|---|---|
| 5,731,772 A | 3/1998 | Mikkola et al. ............ 341/118 |
| 5,749,051 A * | 5/1998 | Dent ........................... 455/324 |
| 5,757,247 A | 5/1998 | Koukkari et al. ........... 333/17.1 |
| 5,815,821 A | 9/1998 | Pettersson ................... 455/575 |
| 5,917,867 A | 6/1999 | Sokoler ....................... 375/350 |
| 6,144,243 A | 11/2000 | Väisänen ..................... 327/307 |
| 6,240,100 B1 * | 5/2001 | Riordan et al. .............. 370/442 |
| 6,321,073 B1 * | 11/2001 | Luz et al. .................. 455/239.1 |
| 6,324,389 B1 | 11/2001 | Väisänen ..................... 455/324 |
| 6,449,471 B1 * | 9/2002 | Katsura et al. .............. 455/324 |
| 6,507,627 B1 * | 1/2003 | Imura ......................... 375/332 |
| 6,516,185 B1 * | 2/2003 | MacNally ................. 455/234.1 |
| 6,700,514 B2 * | 3/2004 | Soltanian et al. ........... 341/118 |

(Continued)

OTHER PUBLICATIONS

U.S. Appl. No. 10/243,331, filed Sep. 13, 2002.

*Primary Examiner*—Nguyen Vo
(74) *Attorney, Agent, or Firm*—Harrington & Smith (57) ABSTRACT

A radio frequency receiver 30, 32, includes a first component block 12, 16, 18, 20; a second compensating component block 22, 22*a*-22*b*, 34; and control circuitry 26 operable for controlling the state (e.g., load, bias, gain) of the first component block. When the control circuitry 26 causes a change in the state of the first component block that is expected to induce a DC offset in a signal, the control circuitry 26 changes the state of the second component block to compensate for an estimate of the DC offset. Preferably, the second component block is a filter 22, 22*a*-22*b*, 34, that temporarily changes from a nominal cutoff frequency to an elevated cutoff frequency so that voltage will settle quickly and accurately at an estimated voltage, the estimated voltage being predetermined and based on the state change to the first component block. A method is also described for practicing the invention.

48 Claims, 9 Drawing Sheets

U.S. PATENT DOCUMENTS

| | | | |
|---|---|---|---|
| 6,771,945 B1 * | 8/2004 | Pickett et al. | 455/324 |
| 6,985,711 B2 * | 1/2006 | Holenstein et al. | 455/312 |
| 7,139,542 B2 * | 11/2006 | Vepsalainen et al. | 455/266 |
| 2001/0049271 A1 * | 12/2001 | Hirtzlin et al. | 455/188.1 |
| 2003/0203727 A1 * | 10/2003 | Kluge et al. | 455/234.1 |
| 2003/0214423 A1 * | 11/2003 | Lee et al. | 341/118 |
| 2004/0053586 A1 * | 3/2004 | Simmons et al. | 455/130 |
| 2004/0097212 A1 * | 5/2004 | Matsumoto et al. | 455/296 |
| 2004/0106380 A1 * | 6/2004 | Vassiliou et al. | 455/73 |

* cited by examiner

METHOD AND APPARATUS FOR COMPENSATING DC LEVEL IN AN ADAPTIVE RADIO RECEIVER

CROSS-REFERENCE TO RELATED APPLICATION

This application is a continuation of U.S. patent application Ser. No 10/378,172, filed on Mar. 3, 2003 and issued on Nov. 21, 2006 as U.S. Pat. No. 7,139,542; and hereby claims priority to that previously filed application.

TECHNICAL FIELD

These teachings relate generally to methods and apparatus for optimizing the performance of radio receivers such as cellular telephones. These teachings particularly relate to compensating for DC offset in a direct conversion radio receiver.

BACKGROUND

Radio frequency components or blocks, such as mixers and analog baseband circuits, introduce a significant DC level in the signal path of direct conversion radio receivers, necessitating DC-offset compensation to cancel the self-imposed DC change from the signal. Prior art solutions passed the received signal through a high pass filter (HPF) prior to an analog-to-digital converter (ADCs) to prevent reduction of the dynamic range of the ADC. Such prior art high pass filters employed a low cut-off frequency ($f_c$) so as not to distort the signal spectrum. For instance, in wideband code division multiplex access (WCDMA) frequency division duplex (FDD), the low frequency cutoff removes about one percent of the bandwidth (i.e.: 10-20 kHz). The remaining portion of the self-imposed DC offset is removed from the signal with additional high pass filters, if necessary.

A self-imposed DC offset may be added to the signal whenever the gain or some other parameter at baseband is modified, the load or the bias current of a mixer is changed, the low noise amplifier (LNA) is switched on or off, or the state of any other component along the signal chain is modified. However, existing methods and apparatus to compensate for self-imposed DC offset suffer in either speed or accuracy. For example, a receiver employing digital modulation of gain control or other parameters introduces a risk of high transient signals at the baseband processing. Those transient signals can deteriorate reception at the radio receiver, such as by saturating the receiver, undermining synchronization, etc. Specifically, download conversion mixers and the first blocks of analog baseband circuitry are susceptible to cause such reception degradation. Prior art solutions employing a high pass filter with a high cutoff frequency may quickly remove the majority of the DC offset, but the resulting voltage typically remains variable within an insufficiently narrow band for an inordinate period of time. Conversely, prior art solutions employing a high pass filter with a low cut off frequency may settle at a stabilized voltage more quickly, but take much longer to remove the majority of the DC offset.

Compactness and low power consumption are important considerations in cellular phone design. Analog DC-compensators typically require large-scale capacitors that occupy an inordinately large circuit area. Additionally, such capacitors sometimes draw excessive power from the cellular phone battery. This invention is directed toward providing a method and apparatus to compensate for self-imposed DC offset that reduces or eliminates at least some of the above identified drawbacks in the prior art.

SUMMARY OF THE PREFERRED EMBODIMENTS

The foregoing and other problems are overcome, and other advantages are realized, in accordance with the presently preferred embodiments of these teachings. In one aspect of the invention, a radio frequency RF receiver has a component block and a compensating block, each disposed along a signal pathway. The receiver further includes control circuitry that is operable for controlling the state of the component block and the compensating block. When the control circuitry changes the state (i.e., bias, load, etc.) of the component block in a manner expected to generate a DC offset, the control circuitry further changes the compensating block from a first state to a second state in a manner to compensate for an estimate of the DC offset that is expected due to the change in the state of the component block.

In another aspect of the invention, a radio frequency receiver is operable to receive packets of radio signals divided by slots, such as (W)CDMA, wherein the slots define slot boundaries. The radio receiver includes a component block, a compensating block, and a signal pathway passing through the component and compensating blocks. The receiver also includes memory for storing an estimated DC offset, and control circuitry. The control circuitry is operable for changing the component block from a first to a second state at a slot boundary, as is known in (W)CDMA. When the change from the first to the second state is expected to induce an actual DC offset that is substantially equal to the estimated DC offset, the control circuitry is further operable for changing the compensating block from a nominal to a compensating state.

In another aspect of the invention, a method for operating a radio frequency RF receiver is described. The method includes changing a status of a component block in a manner expected to induce a DC offset in a signal passing along a signal pathway, changing a state of a compensating block from a first state to a second state to compensate for the DC offset that is expected; and changing the status of the compensating block back to the first state.

BRIEF DESCRIPTION OF THE DRAWINGS

The foregoing and other aspects of these teachings are made more evident in the following Detailed Description of the Preferred Embodiments, when read in conjunction with the attached figures, wherein.

DETAILED DESCRIPTION OF THE PREFERRED EMBODIMENTS

Figure 1:
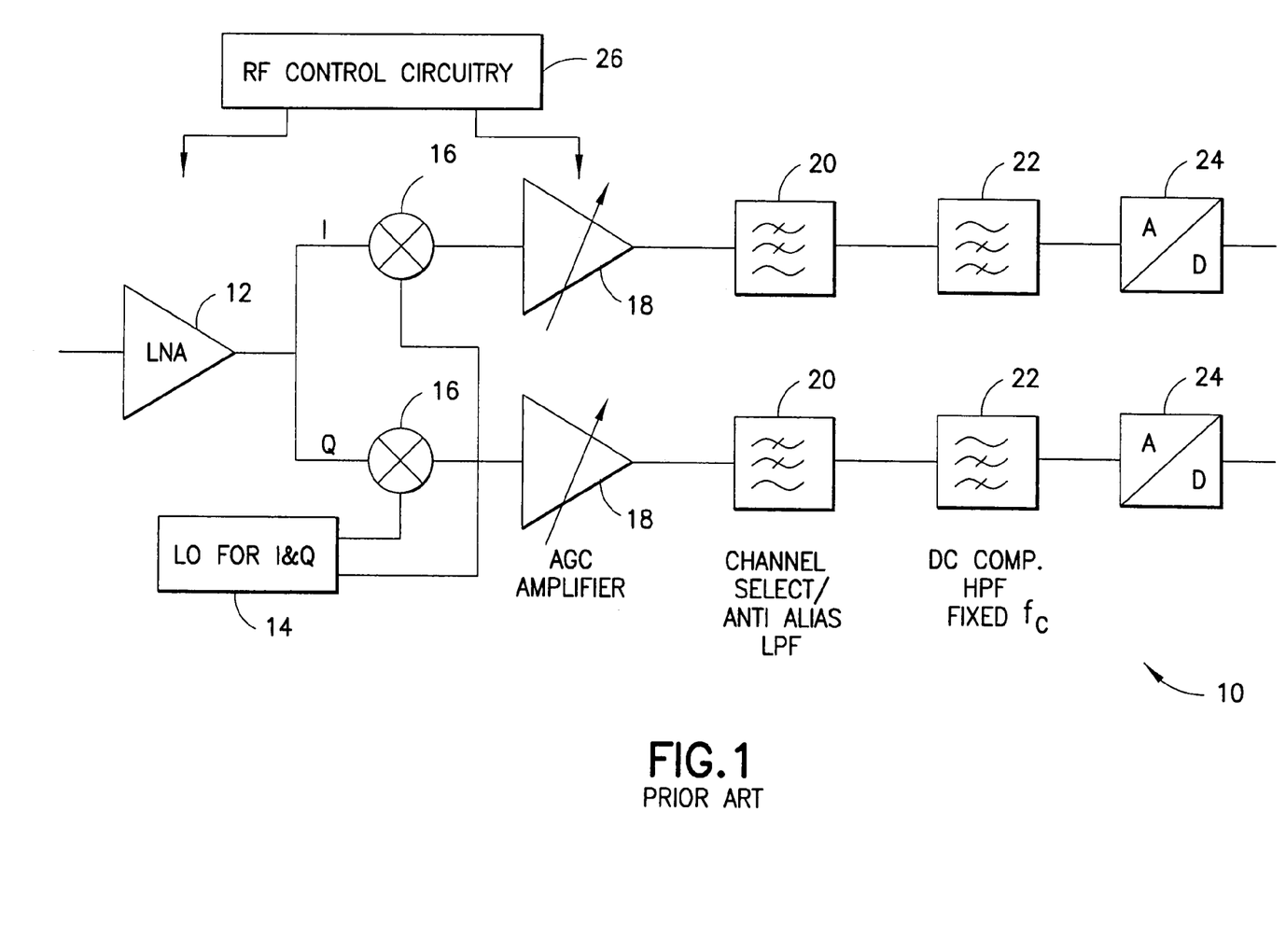
FIG. 1 is a block diagram depicting a prior art direct conversion radio receiver.

FIG. 1 is a block diagram depicting a conventional direct conversion receiver 10 in accordance with the prior art. Output signals from a low noise amplifier (LNA) 12 and a local oscillator 14 are input into parallel in-phase (I) and quadrature (Q) mixers 16. Signals output from each mixer 16 pass through an automatic gain control amplifier 18, a channel select/anti alias low pass filter 20 and a DC compensation high pass filter 22, characterized by a single fixed cutoff frequency. The signal output from the high pass filter 22 enters an analog to digital converter 24. The radio frequency control circuitry 26 of FIG. 1 controls only the gain of the amplifiers 12 and 18. In a slot-based wireless telephony system such as (W)CDMA, changes to the state (i.e., bias, load) of the RF receiver done to improve power consumption or linearity, for example, are done only at a boundary of the slot. The order of components may vary from that shown in FIG. 1, and the DC compensation may be done in several phases (i.e., a portion immediately after the mixer, the remainder immediately before the ADC 24) without departing from the broad teachings of this invention or the claims.

Figure 2A:
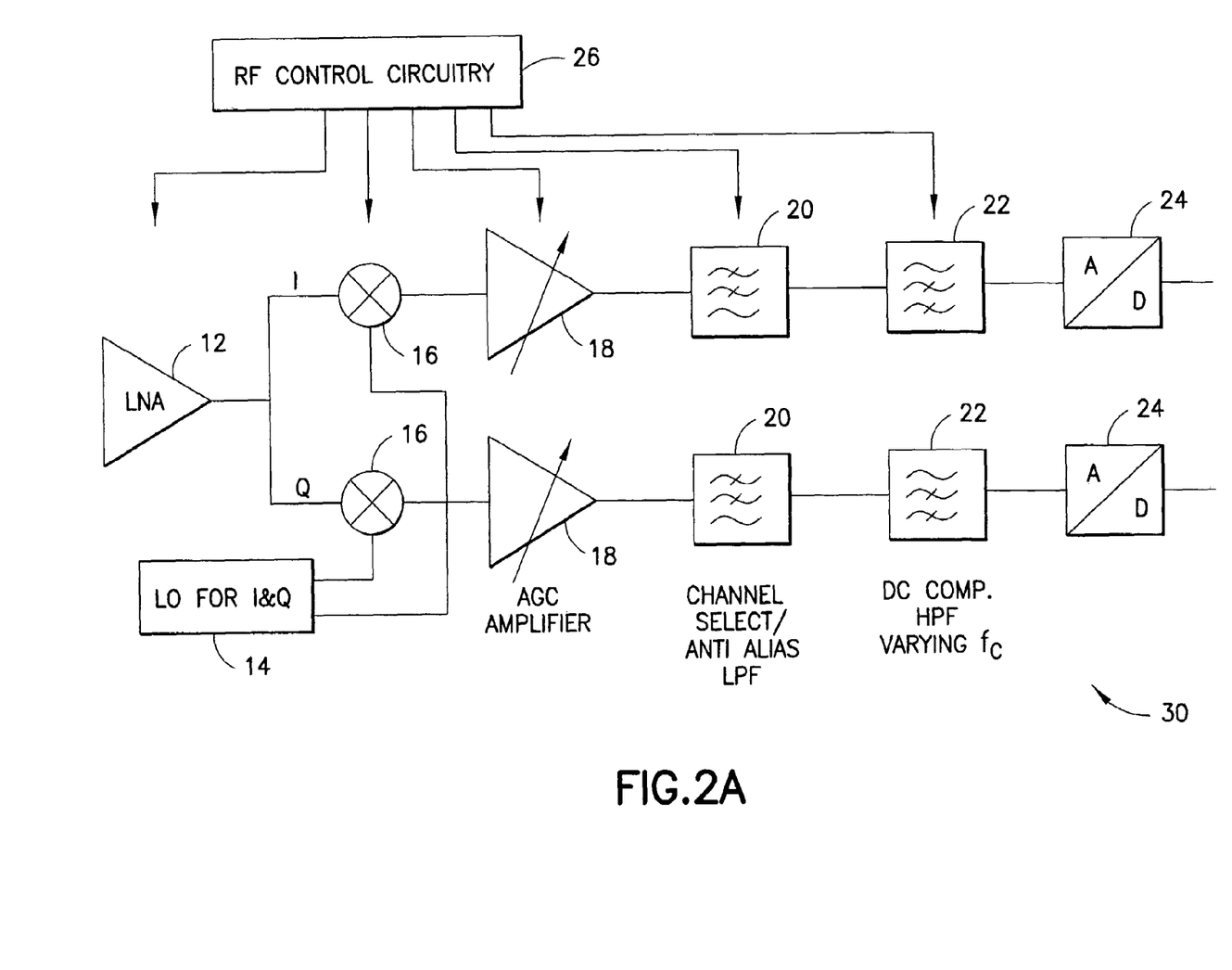
FIG. 2A is a block diagram depicting a direct conversion radio receiver according to one aspect of the present invention.

Because the RF control circuitry 26 is used to control the amplifier gain, it can be known in advance when a self-imposed DC offset will occur, and to what extent. FIG. 2A is a block diagram depicting a direct conversion receiver 30 according to one aspect of the present invention. A low noise amplifier 12 and a local oscillator 14 are arranged as previously described with respect to I-Q mixers 16. Similarly, automatic gain control amplifiers 18, low pass filters 20, and analog to digital converters 24 are arranged as previously described. However, the high pass filters 22 have a variable cutoff frequency, and the RF control circuitry 26 of FIG. 2 controls the mixers 16 and filters 20, 22 as well as the bias and gain of the amplifiers 12, 18. Whenever a predetermined change in a state of the receiver occurs (such as a change in amplifier gain, a change in bias current of the mixer, or turning the low noise amplifier 12 on or off), the RF control circuitry 26 temporarily switches the DC offset compensation circuitry (high pass filter 22) to a higher cutoff frequency to facilitate fast settling of the compensated signal.

Figure 2B:
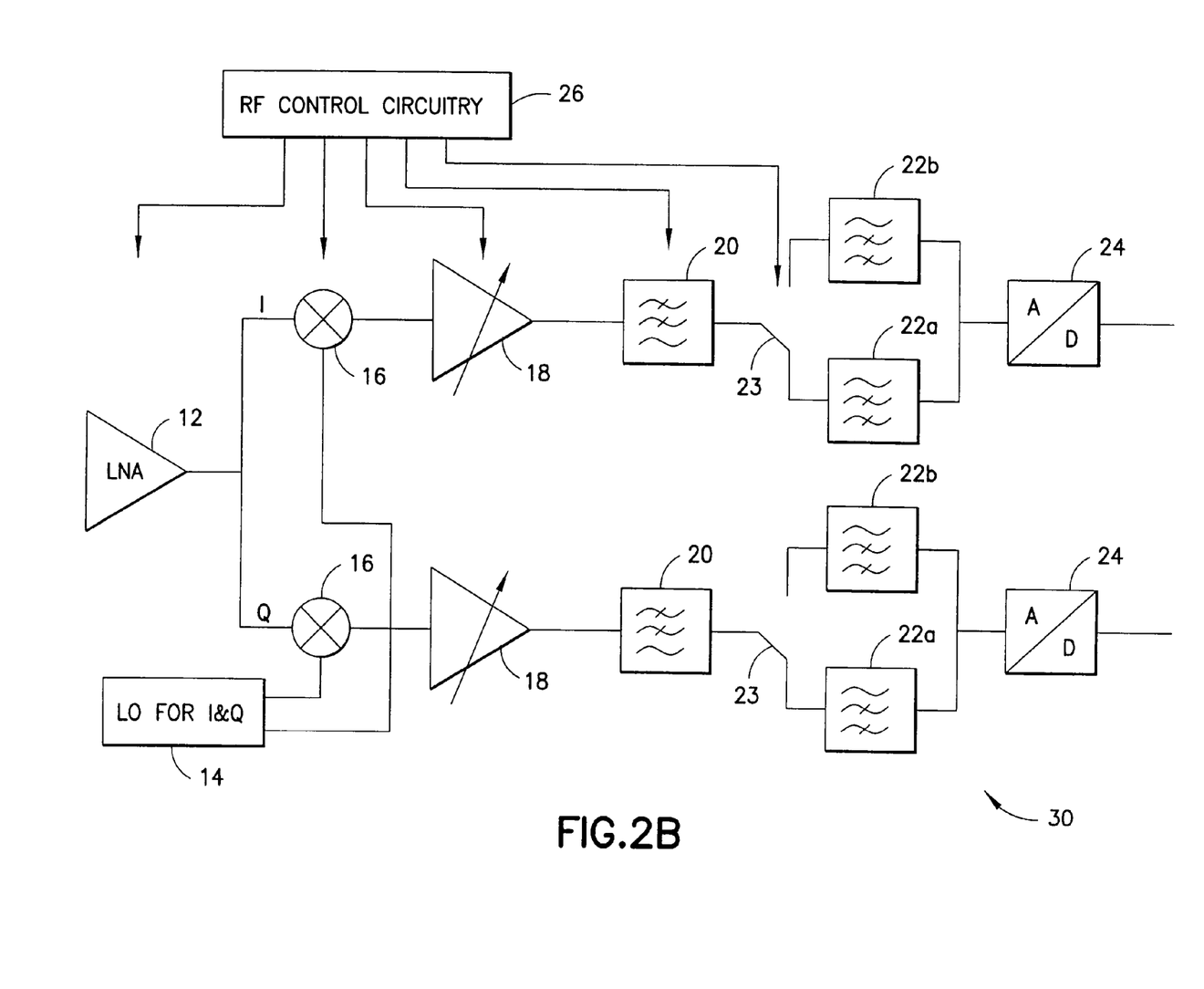
FIG. 2B is a block diagram similar to FIG. 2A, but wherein a gate controls the signal pathway into either of two filters with different fixed cutoff frequencies.

An alternative arrangement is depicted at FIG. 2B, wherein a pair of DC compensation filters, each with a fixed but different cutoff frequency, replace the DC compensation filter of FIG. 2A. In this embodiment, the RF control circuitry 26 controls the gate 23 that changes the signal pathway between the DC compensation filter with the lower cut-off frequency, 22a, and the filter with a higher cut-off frequency, 22b.

The switch from the lower or nominal cutoff frequency (which may be a compensating state) to the higher cutoff frequency (which may be considered a fast-compensating state) may be made every time the state of the receiver 30 is changed by the internal control 26 of the receiver 30. The change in cutoff frequency may be made at the same time that the change in state is made to those components that induce the DC offset, or at a time slightly earlier or later. The change in cutoff frequency need not be based on a measured voltage change that reflects the actual DC offset once it is already imposed. Rather, the change in cutoff frequency may be done based only on an expected change in DC offset, the expectation arising from knowing the change being made to other components or component blocks within the receiver. The particular type of DC offset that is the focus of this invention (i.e., offset imposed by changes the receiver makes to itself rather than directed from outside the receiver) may be compensated based on an estimated offset rather than a measured one, at a time before or after the onset of an actual offset, and at a position along the signal pathway before or after the actual offset in introduced into the signal.

However, even for a receiver employing the present invention, interfering RF signals may cause a DC level shift for which there are no pre-programmed estimates for the DC offset. In a CDMA system, for example, interfering signals may arise from other code channels of the same or nearby base stations, jamming signals, thermal noise in the band of interest, and additional noise/interference caused by the receiver itself (e.g., receiver noise figure, intermodulation and intersymbol interference, oscillator phase noise, and quantization noise). Total interference at any given time, from one or a combination of the above, may cause a shift in the DC level within the receiver block that is not anticipated, and therefore not programmed into algorithms that drive the RF control circuitry 26. DC offset due to interference occurs occasionally and its direction cannot be known in advance. Such interference based offset may cause the RF circuitry 26 to compensate in a real time, reactive form. In this case, however, this invention can still be employed to advantage by switching the compensating block 22 into a fast compensating state to correct for the DC level shift in a more rapid manner.

The switch from the higher cut off frequency back to the lower or nominal cutoff frequency may be based, for example, on an elapsed time interval, the changing signal level, or the slope of voltage or current versus time within the DC compensator block. Preferably, the switch from lower to higher cutoff frequency is enabled only for certain state changes that are predetermined to impose a DC offset that exceeds a predetermined threshold, and the switch back to the lower cutoff frequency occurs after an elapsed time interval. Particular actions that change the receiver control state in a manner estimated to exceed such a predetermined threshold may be determined through simulation and/or measurement, and subsequently programmed and stored in memory to drive the RF control circuitry 26 of the receiver 30.

Figure 3:
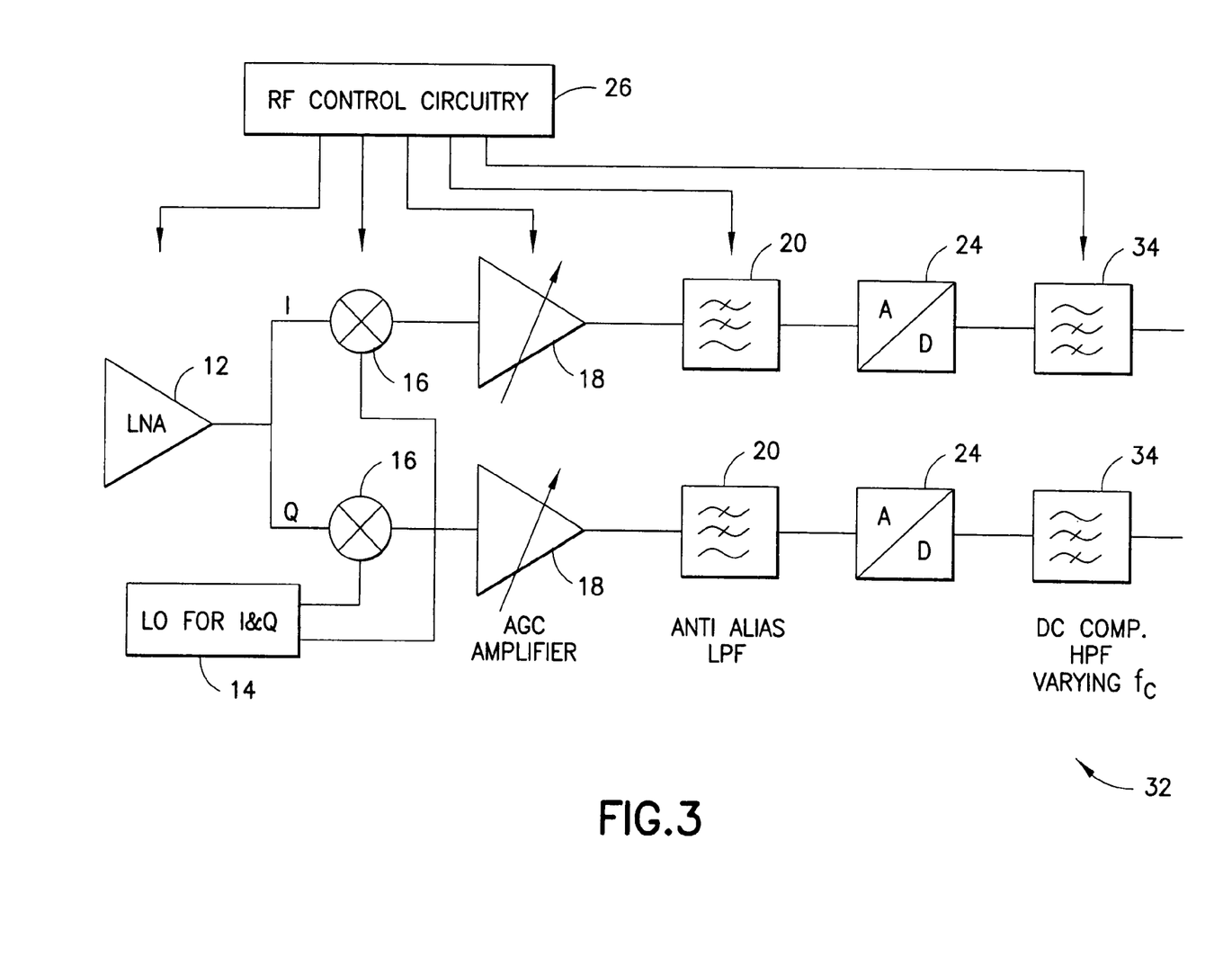
FIG. 3 is a block diagram depicting the preferred embodiment of the invention, wherein the control circuitry controls a digital filter with variable cut-off frequencies.

FIG. 3 depicts in block diagram form the preferred embodiment of the present invention. More advanced ADCs, such as those used in current generation cellular phone radio receivers, define a higher dynamic range than their predecessors. This higher dynamic range may now enable the use of strictly digital compensators for the DC caused in the RF blocks, minimizing or eliminating entirely the need for analog DC-compensation. Such an entirely digital solution is presented in FIG. 3. Individual components of the radio receiver 32 are as previously described, and the digital DC compensation high pass filter 34 is disposed subsequent to the analog to digital converter 24 and defines a variable cutoff frequency. The RF control circuitry 26 controls gain and bias of the amplifiers 12, 18; bias of the mixer 16; and cutoff frequency for the digital high pass filter 34 for fast adaptation to a self-imposed DC level change.

Figure 4:
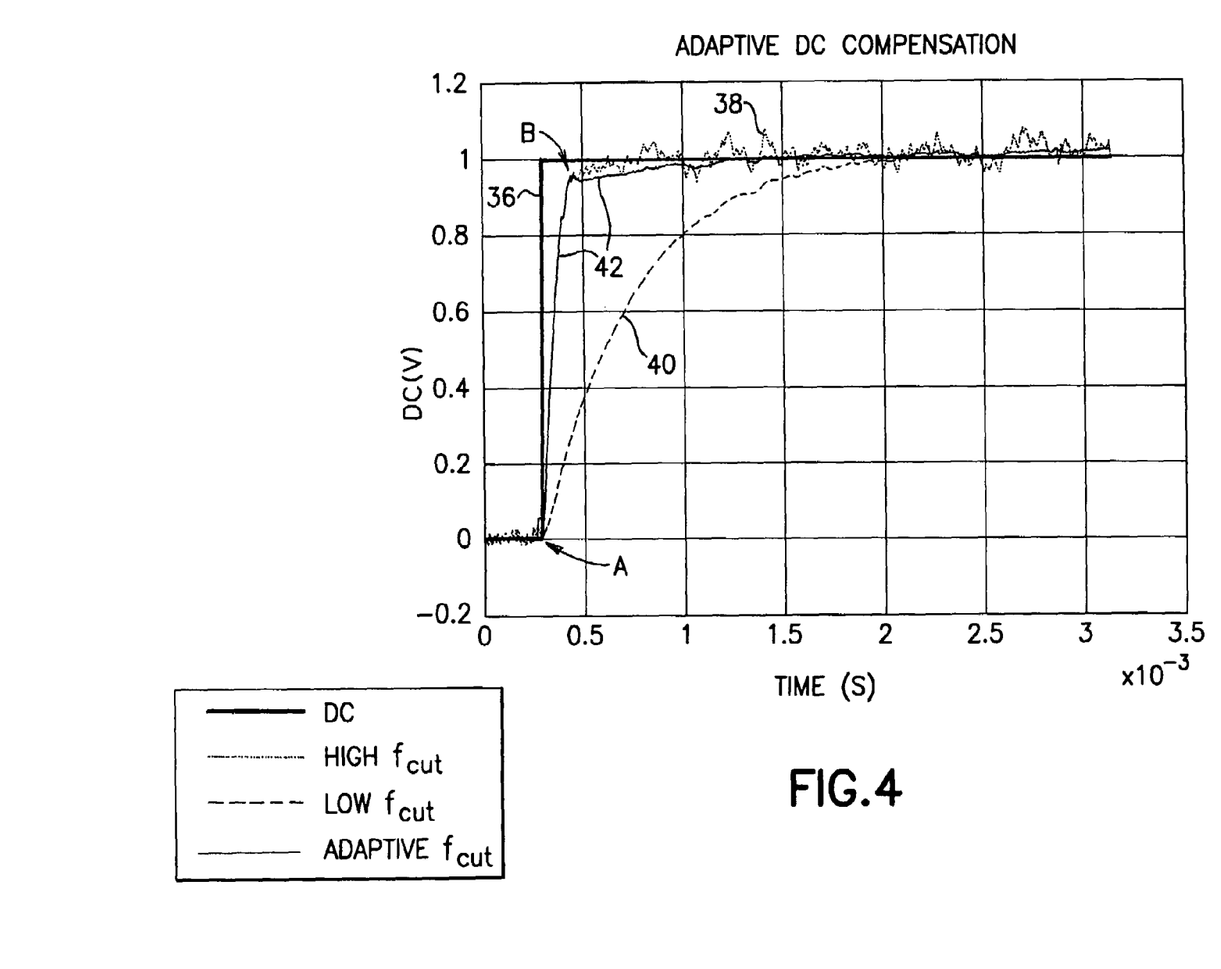
FIG. 4 is a graph depicting DC offset voltage versus time, and illustrating one advantage of the invention.

FIG. 4 is a graph depicting DC offset voltage versus time for several radio receivers. The DC voltage offset is exaggerated to better illustrate an advantage of the invention. A DC offset is imposed at approximately 0.3 milliseconds at an amplitude of 1.0 volts, designated by curve 36. A receiver having only a fixed high cutoff frequency, designated by curve 38, compensates for the DC offset quickly but not accurately due to oscillation about the true offset voltage. A receiver having only a fixed low cut off frequency, designated by curve 40, accurately compensates for the DC voltage but only after a non-trivial amount of time has elapsed. A radio receiver that switches the cutoff frequency according to the present invention between a fast compensating and a fast settling state, designated by curve 42, captures the advantages of curves 38 and 40. As described above, the initial switching from lower cutoff to higher cutoff frequencies along curve 42 may occur at inflection point A. The subsequent switch back to the lower cutoff frequency may occur at inflection point B. The location of inflection point B along curve 42 may be determined by a time interval as measured from inflection point A, by a change in the slope of the curve 42, or by a preset minimum difference between actual and estimated voltage, wherein each estimated voltage for each particular change of state for each component or block of the receiver circuitry may be derived from laboratory measurements or calculations.

Figure 5:
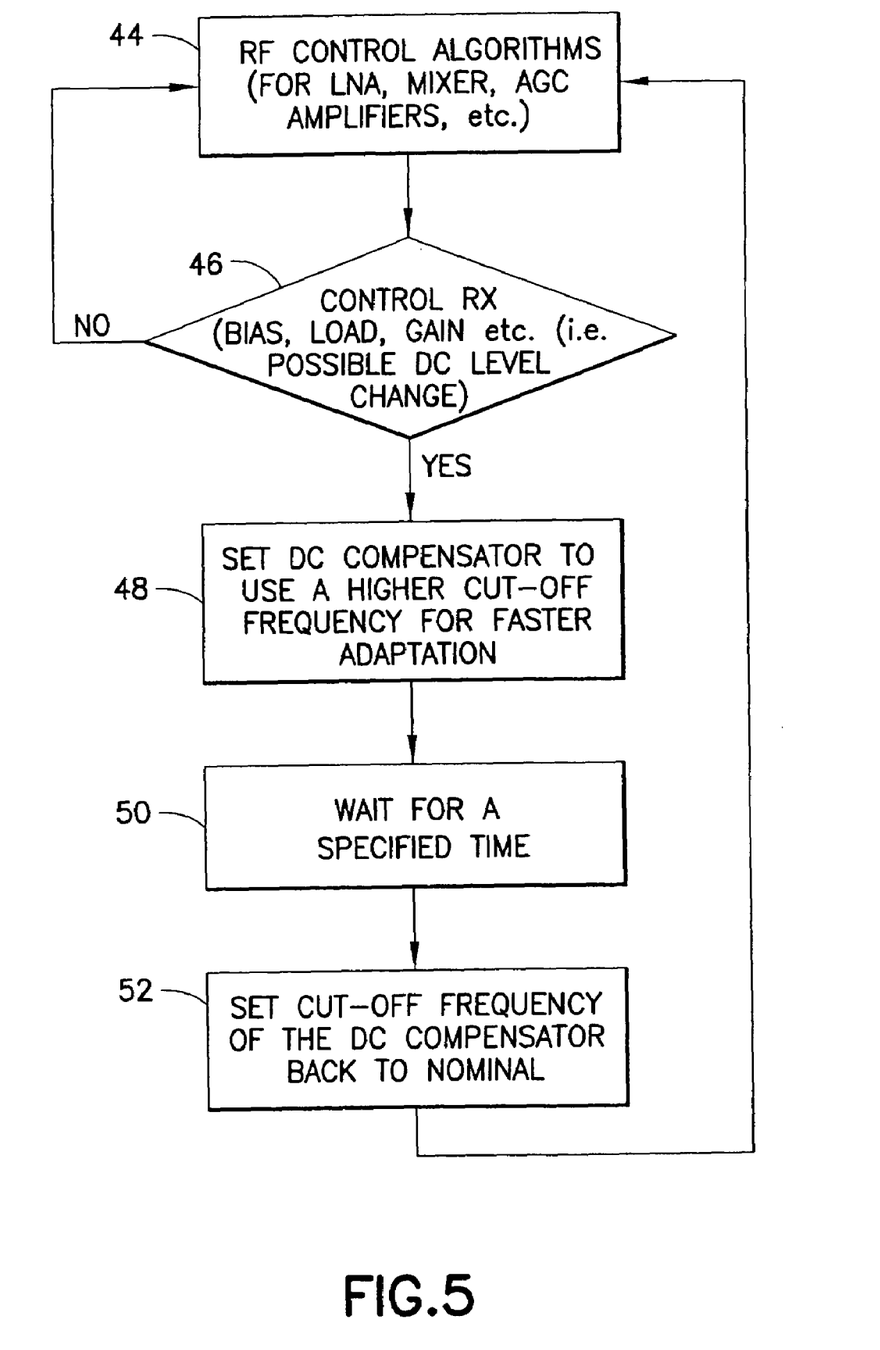
FIG. 5 is a flow diagram illustrating the preferred method for controlling self-induced DC offset compensation.

FIG. 5 is a flow diagram illustrating a preferred method for controlling self-induced DC offset compensation in a direct conversion radio receiver. Radio frequency control algorithms at box 44, which themselves control the RF control circuitry 26 of the radio receiver 30, 32, exert control over reception circuitry at box 46. If the control at box 46 is one of those predetermined to result in a DC level change that exceeds a threshold level for that particular control, the DC compensator is adjusted to use a higher cutoff frequency for faster adaptation at box 48. After awaiting a specified time at box 50, which may be a fixed time for all reception controls, or a time specific to each reception control, the DC compensator cutoff frequency is returned to its nominal, lower level at box 52.

Figure 6:
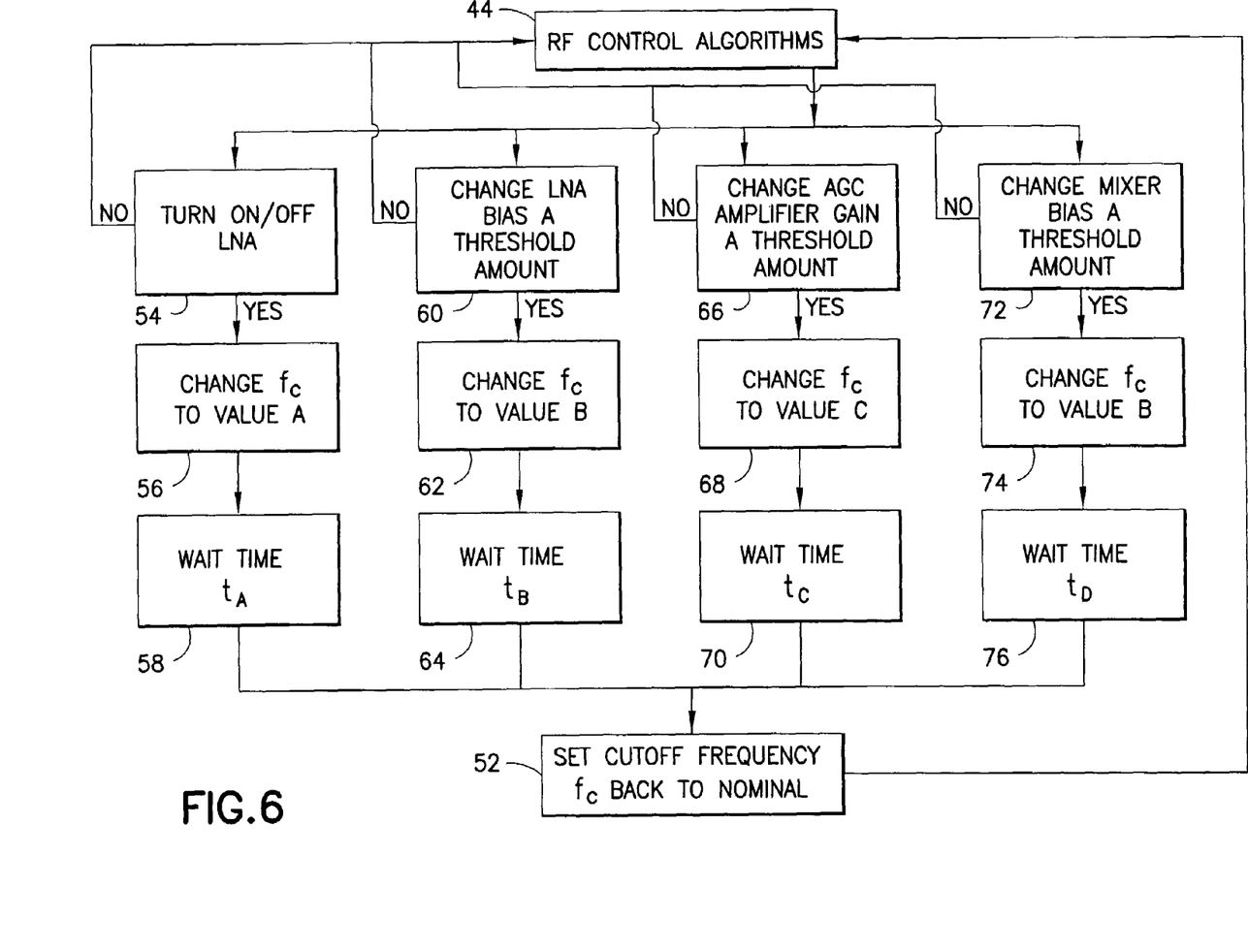
FIG. 6 is a flow diagram of the method of FIG. 5, but wherein changes to the state of different components triggers different filter frequency cutoffs.

The invention is not limited only to a low frequency cutoff and a high frequency cutoff. Specifically, a plurality of frequency cutoffs may be employed in a parallel-type flow diagram arrangement such as depicted in FIG. 6, wherein different reception controls trigger different frequency cutoffs. For example, turning the low noise amplifier on or off at box 54 may result in changing the cut off frequency to a value A in box 56 and awaiting a time interval $t_A$ at box 58 before resetting the cut off frequency to its nominal value at box 52. However, changing the low noise amplifier bias an amount greater than a threshold amount at box 60 may result in a cutoff frequency being changed to a different value B at box 62 for a time $t_B$ at box 64. Changing the gain of an automatic gain control amplifier by a threshold amount at box 66 may yield a cut off frequency change to yet another value C at box 68 for a different time interval $t_C$ at box 70.

Not every reception control change need result in a unique cut off frequency for a unique time. For example, changing a mixer bias by at least a threshold amount at box 70 may result in the cut off frequency being changed to valued B at box 74, similar to the value B at box 62 when the bias of the low noise amplifier was changed. The resulting cutoff value from changing the mixer bias may then result in a waiting time of $t_D$ at box 76 that may differ from the awaiting time $t_B$ at box 64 prior to returning the cutoff frequency back to its nominal value at box 52.

Figure 7:
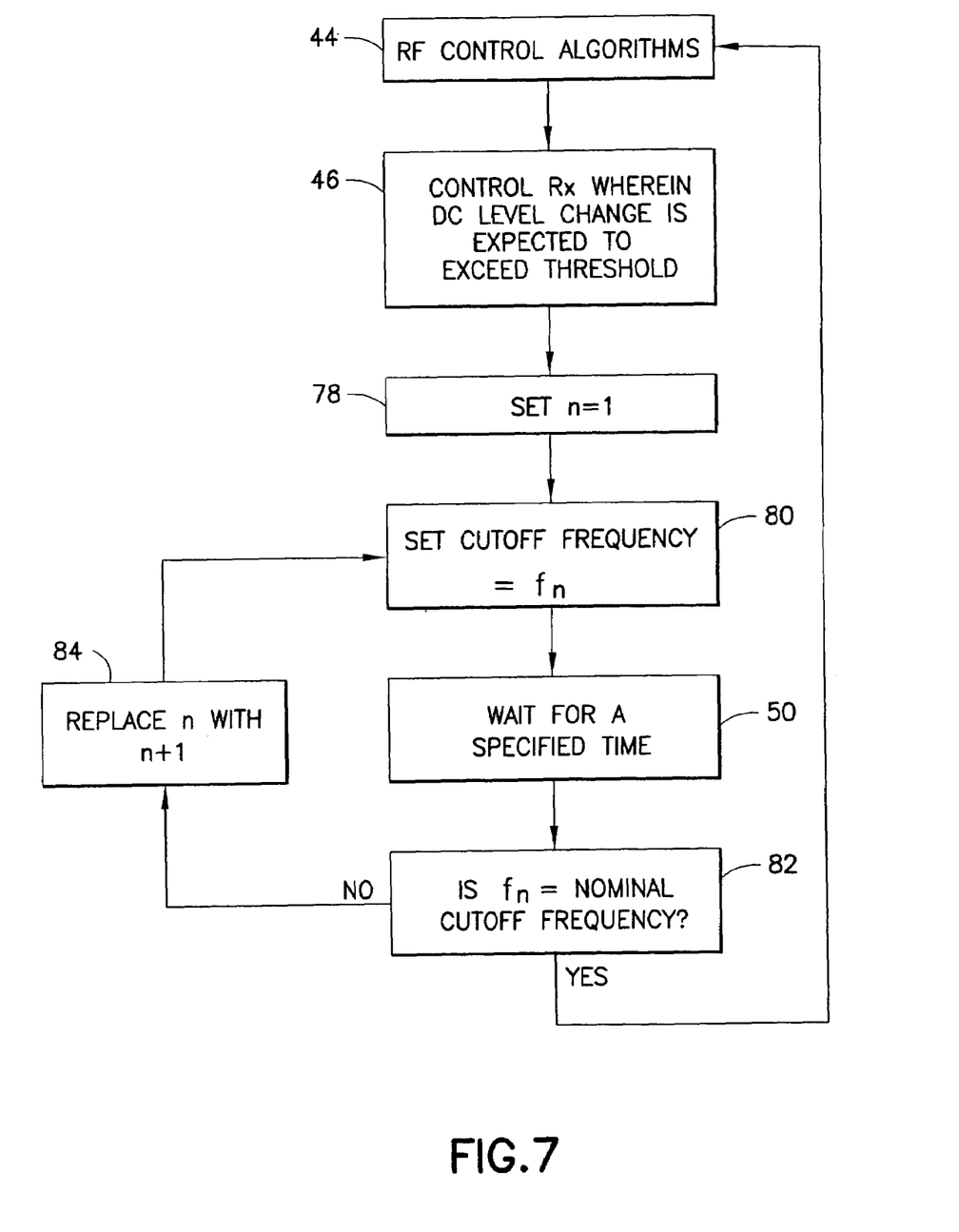
FIG. 7 is a flow diagram of the method of FIG. 5, but wherein a series of incremental filter frequency cutoffs are employed for a single state change that induces DC offset.

Additionally or alternatively, a plurality of frequency cutoffs may be employed in a series-type flow diagram arrangement such as depicted in FIG. 7. In the flowchart of FIG. 7, the DC compensator is initially switched-to the highest cutoff frequency at box 78 and 80, where n=1 and $f_1$ represents the highest cutoff frequency. After a specified time (or slope change, voltage difference, etc.) at box 50, the DC compensator is switched to incrementally lower cut-off frequencies at the iterations of box 82 and 84, wherein each $f_{n+1}$ represents the next succeeding lower cut off frequency. The loop is continued until eventually returning to the nominal cutoff frequency at box 82. The arrangement of FIG. 7 maximally reduces the time for complete and accurate DC offset compensation. The methods of FIGS. 6 and 7 may be combined for extremely precise and responsive compensation for self-imposed DC offset.

Figure 8:
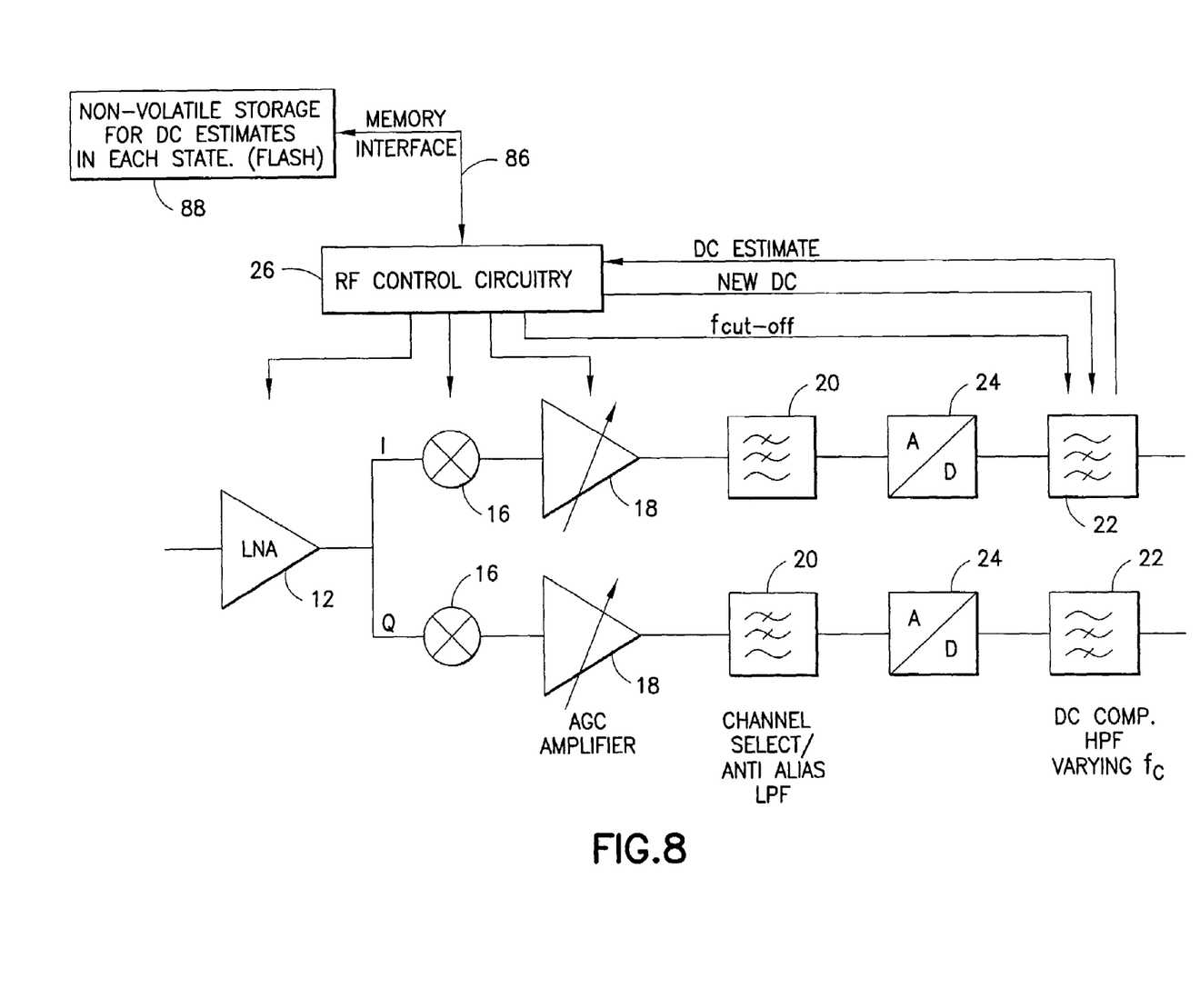
FIG. 8 is a block diagram similar to FIG. 3, but wherein a feedback loop enables a memory of the mobile station to store rolling averages of DC estimates for various state changes.

FIG. 8 is a block diagram similar to that of FIG. 3 but depicting a further refinement; a self-learning capability that reads the estimates of the DC from the DC compensator (HPF 22) to the control circuitry 26 and then stores the long time DC averages of each state into the non-volatile memory 88 of the mobile station. The term "state" as used herein refers to a combination of every gain, bias and load control in a block of components. Each state may have its own nominal DC level. Each time the relevant state of the receiver is changed (that is, the state of the components in the block apart from the compensating block), the stored estimate of the DC in the new state is loaded into the DC compensating block (HPF 22) at the same time as the cut-off frequency is momentarily changed. This arrangement is preferably implemented using a digital DC compensator (HPF 22).

Various components of FIG. 8 with like reference numbers are as previously described herein. In this embodiment, the RF control circuitry 26 includes an interface 86 with a memory 88 for storing estimates of DC compensation for each of the states and each of the components controlled by the circuitry 26. Preferably, these estimates are rolling averages taken over the most recent series of state changes and are thus continually updated. Initial values for DC compensation for each state change of each component, or combinations of state changes, may be pre-programmed in memory 88. Upon first use, the RF control circuitry 26 operates similar to that described with reference to FIG. 3, except that upon effecting a change in the state of a component block (apart from the high pass filter 22), it accesses the stored estimate of DC offset compensation and sets the initial cutoff frequency of the HPF 22 based on that stored estimate. Simultaneous or nearly so with the RF control circuitry 26 directing the initial cutoff frequency, the HPF 22 reports a DC estimate to the RF control circuitry 26. The average DC compensation in memory 88 is updated, and a new cutoff frequency is set at the HPF 22 through the RF control circuitry 26. This new cutoff frequency may be directed by the control circuitry 26 regardless of whether or not other components have undergone an additional state change.

The embodiment of FIG. 8 incorporates a feedback loop between the control circuitry 26 and the HPF 22, whereby actual parameters (i.e., voltage) may be monitored and adjusted, compared to the stored estimated parameters, and memory 88 is updated at least as often as the frequency cutoff of the HPF 22 is changed, and preferably no less frequently than a set time interval. The RF circuitry 26, in combination with memory 88, updates the DC compensation value that is in memory 88 for the specific combination of component states.

While described in the context of presently preferred embodiments, those skilled in the art should appreciate that various modifications of and alterations to the foregoing embodiments can be made, and that all such modifications and alterations remain within the scope of this invention. Examples herein are stipulated as illustrative and not exhaustive.

What is claimed is:

1. A method for operating a radio frequency RF receiver, comprising:

changing a component block from a first component block state to a second component block state that is expected to induce a predetermined DC offset in a signal passing along a signal pathway by changing at least two different type components in the block each in a manner that contributes to the predetermined DC offset, wherein changing the component block from the first to the second component block state comprises at least one of changing bias of a mixer, changing bias of a filter, turning a low noise amplifier on or off and changing at least one of bias or gain of a low noise amplifier;

automatically responsive to changing from the first to the second component block state, changing a compensating state of an adaptive filter block from a first compensating state to a second compensating state to compensate for the predetermined DC offset; and changing the state of the adaptive filter block back to the first compensating state.

2. The method of claim 1, wherein the adaptive filter block comprises at least one filter, the first compensating state comprises a first cutoff frequency of the at least one filter and the second compensating state comprises a second cutoff frequency of the at least one filter that is higher than the first cutoff frequency.

3. The method of claim 2, wherein the at least one filter comprises first and second filters in parallel with one another, the first filter having the first cutoff frequency and the second filter having the second cutoff frequency;

wherein changing the state of the adaptive filter block to the first compensating state comprises switching a signal pathway to the first filter and wherein changing the state of the adaptive filter block from the first compensating state to the second compensating state comprises switching the signal pathway to the second filter.

4. The method of claim 1, wherein the adaptive filter block is disposed along a signal pathway in series with and prior to the component block.

5. The method of claim 1, wherein changing the adaptive filter block to the second compensating state is in anticipation of changing the component block to the second component block state.

6. The method of claim 1 wherein the adaptive filter block comprises an analog component.

7. The method of claim 1, wherein the adaptive filter block comprises a digital filter and the component block comprises an analog component.

8. The method of claim 1 wherein changing the state of the adaptive filter block back to the first compensating state is based on an elapsed time interval.

9. The method of claim 1, wherein changing the state of the adaptive filter block back to the first compensating state is based on a slope of DC voltage versus time for a signal passing through the adaptive filter block and the component block.

10. The method of claim 1, wherein changing the state of the adaptive filter block back to the first compensating state is based on a minimum difference between an estimated voltage and an actual voltage of a signal passing through the adaptive filter block and the component block.

11. The method of claim 1, wherein changing the state of the adaptive filter block back to the first compensating state comprises incrementally lowering a cutoff frequency at the adaptive filter block.

12. The method of claim 11, wherein the cutoff frequency is incrementally lowered by steps that are separated by at least one of a predetermined time, a slope change of DC voltage versus time, and a difference between actual and estimated voltage.

13. The method of claim 1, further comprising updating a stored value of the predetermined DC offset in accordance with a measured voltage.

14. The method of claim 1, further comprising: storing a value of the predetermined DC offset for the component block.

15. The method of claim 1, wherein changing the component block to the second component block state occurs at a boundary of a signal.

16. The method of claim 15, wherein the boundary comprises a time slot boundary.

17. The method of claim 15, wherein the component block and the adaptive filter block operate on a signal for transmission in a wireless radio access system.

18. The method of claim 17, wherein the wireless radio access system comprises a wideband code division multiple access system.

19. The method of claim 1 executed by a direct conversion receiver.

20. An apparatus comprising:
a component block comprising at least two components of different type in series with one another;
an adaptive filter block;
a signal pathway passing through the component block and the compensating adaptive filter block;
a memory adapted to store a DC offset value associated with a component block state change that may be imposed by control circuitry; and
control circuitry configured to change each of the at least two components in a manner that results in changing the component block from a first component block state to a second component block state;
said control circuitry further being operable for accessing the memory, selecting a stored DC offset value that corresponds to changing the component block from the first to the second component block state, and changing the adaptive filter block from a first compensating state to a second compensating state using the selected DC offset value,
wherein one of the at least two components comprises a mixer, a filter or a low noise amplifier and wherein changing the component block from the first to the second component block state comprises at least one of changing bias of the mixer, changing bias of the filter, turning the low noise amplifier on or off and changing at least one of bias or gain of the low noise amplifier.

21. The apparatus of claim 20, wherein the first compensating state comprises a first cutoff frequency of the adaptive filter block and the second compensating state comprises a second cutoff frequency of the adaptive filter block that is higher than the first cutoff frequency.

22. The apparatus of claim 21, wherein the adaptive filter block comprises first and second filters in parallel with one another, the first filter having the first cutoff frequency and the second filter having the second cutoff frequency, and wherein the control circuitry is configured to change the adaptive filter block to the second compensating state and from the second compensating state to the first compensating state by controlling a gate disposed between the parallel filters and the component block.

23. The apparatus of claim 20, wherein the adaptive filter block is disposed along a signal pathway in series with and prior to the component block.

24. The apparatus of claim 20, wherein the adaptive filter block comprises an analog filter.

25. The apparatus of claim 20, wherein the adaptive filter block comprises a digital filter and the component block comprises an analog component, the apparatus further comprising an analog to digital converter disposed between the digital filter and the analog component.

26. The apparatus of claim 20, wherein the adaptive filter block comprises a digital filter having a programmable cut off frequency.

27. The apparatus of claim 20, wherein the control circuitry is configured to change the adaptive filter block from the second compensating state to the first compensating state when a time interval elapses after changing the adaptive filter block to the second compensating state.

28. The apparatus of claim 20, wherein the control circuitry is configured to change the adaptive filter block from the second compensating state to the first compensating state based on a slope of DC voltage versus time for a signal passing through the adaptive filter block and the component block.

29. The apparatus of claim 20, wherein the control circuitry is configured to change the adaptive filter block from the second compensating state to the first compensating state based on a difference between an estimated voltage and an actual voltage of a signal passing through the adaptive filter block and the component block.

30. The apparatus of claim 20, wherein the control circuitry is configured to change the adaptive filter block from the second compensating state to the first compensating state by incrementally lowering a cutoff frequency of the adaptive filter block.

31. The apparatus of claim 30, wherein the cutoff frequency is incrementally lowered by steps that are separated by at least one of a predetermined time, a slope change of DC voltage versus time, and a difference between actual and estimated voltage.

32. The apparatus of claim 20, further comprising a feedback loop between the control circuit and the adaptive filter block, the control circuit further configured to update the DC offset value stored in the memory in accordance with a measured voltage received over the feedback loop.

33. The apparatus of claim 20, wherein the memory is further adapted to store a predetermined time in association with the DC offset value and the component block state change, and the control circuitry is adapted to change the adaptive filter block from the second compensating state to the first compensating state after the predetermined time elapses.

34. The apparatus of claim 20, wherein the memory is adapted to store a plurality of associations of values of DC offsets with states of the components block, wherein at least two component of the components block are associated with different values of DC offsets.

35. The apparatus of claim 20, the apparatus comprising a wireless receiver.

36. The apparatus of claim 35, the apparatus comprising a direct conversion receiver.

37. The apparatus of claim 36, the apparatus comprising a wideband code division multiple access receiver.

38. An apparatus comprising:
means for changing a component block from a first component block state to a second component block state that is expected to induce a predetermined DC offset in a signal passing along a signal pathway by changing at least two different type components in the block each in a manner that contributes to the predetermined DC offset, wherein changing the component block from the first to the second component block state comprises at least one of changing bias of a mixer, changing bias of a filter, turning a low noise amplifier on or off and changing at least one of bias or gain of a low noise amplifier;
means, automatically responsive to changing from the first to the second component block state, for changing a compensating state of an adaptive filter block from a first compensating state to a second compensating state to compensate for the predetermined DC offset; and
means for changing the state of the adaptive filter block back to the first compensating state.

39. The apparatus of claim 38, further comprising a memory means operable to store a DC offset value corresponding to the predetermined DC offset in association with the second component block state, wherein:
the means for changing the component block comprises a control circuit having a first control output coupled to one of the filter, the mixer and the low noise amplifier;
the memory means comprises a memory;
the means for changing the compensating state of the adaptive filter block comprises the control circuit having a second control output coupled to at least one filter for increasing a cutoff frequency of the at least one filter; and
the means for changing the state of the adaptive filter block back to the first compensating state comprises the control circuit having the second control output coupled to the at least one filter for decreasing a cutoff frequency of the filter after a time period elapses, the time period associated in the memory means with the second component block state.

40. The apparatus of claim 38, wherein the means for changing the state of the adaptive filter block back to the first compensating state is based on at least one criterion comprising at least one of an elapsed time interval after changing the adaptive filter block to the second compensating state, a slope of DC voltage versus time, and a difference between an estimated voltage and an actual voltage.

41. A circuit comprising a component block and adaptive filter block in series with one another, and a control circuit, the control circuit comprising:
a first control output adapted to change the component block from a first component block state to a second component block state that is expected to induce a predetermined DC offset in a signal passing along a signal pathway by changing at least two different type components in the block each in a manner that contributes to the predetermined DC offset, wherein changing the component block from the first to the second component block state comprises at least one of changing bias of a mixer, changing bias of a filter, turning a low noise amplifier on or off and changing at least one of bias or gain of a low noise amplifier;
a data input adapted to determine from a memory a DC offset value by which to compensate for the second component block state of the component block, wherein the DC offset value is associated with the predetermined DC offset;
a second control output adapted to change a compensating state of the adaptive filter block from a first compensating state to a second compensating state to compensate for the predetermined DC offset.

42. The circuit of claim 41, wherein the DC offset value comprises an estimate of the predetermined DC offset.

43. The circuit of claim 41, wherein the control circuit further comprises a feedback input adapted to receive a measured value after the second control output changes the adaptive filter block to the second compensating state.

44. The circuit of claim 43, wherein the data input comprises a bidirectional link, the control circuit further comprising a logic circuit to update an estimate of the predetermined DC offset with the measured value.

45. The circuit of claim 41, wherein the second control output is further adapted to change the adaptive filter block from the second compensating state to the first compensating state based on at least one criterion.

46. The circuit of claim 45, wherein the at least one criterion comprises an elapsed time associated in the memory with the DC offset value and with the second component block state.

47. The circuit of claim 45, wherein the at least one criterion comprises a slope of DC voltage versus time.

48. The circuit of claim 45, wherein the at least one criterion comprises a difference between an estimated voltage and an actual voltage.

* * * * *